United States Patent
Krithivas et al.

(10) Patent No.: US 9,535,606 B2
(45) Date of Patent: Jan. 3, 2017

(54) VIRTUAL SERIAL PRESENCE DETECT FOR POOLED MEMORY

(71) Applicant: Intel Corporation, Santa Clara, CA (US)

(72) Inventors: Ramamurthy Krithivas, Chandler, AZ (US); Eswaramoorthi Nallusamy, Puyallup, WA (US); Mark A. Schmisseur, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/580,008

(22) Filed: Dec. 22, 2014

(65) Prior Publication Data

US 2016/0179383 A1    Jun. 23, 2016

(51) Int. Cl.
*G06F 3/06* (2006.01)
*G06F 12/06* (2006.01)

(52) U.S. Cl.
CPC .......... *G06F 3/0604* (2013.01); *G06F 3/0631* (2013.01); *G06F 3/0664* (2013.01); *G06F 3/0683* (2013.01); *G06F 12/0692* (2013.01); *G06F 2212/1041* (2013.01); *G06F 2212/657* (2013.01)

(58) Field of Classification Search
None
See application file for complete search history.

(56) References Cited

U.S. PATENT DOCUMENTS

| | | |
|---|---|---|
| 2009/0307458 A1 | 12/2009 | Nogueras et al. |
| 2012/0137103 A1 | 5/2012 | Logan et al. |
| 2013/0042047 A1 | 2/2013 | Nishio |
| 2013/0159632 A1 | 6/2013 | Caparros Cabezas et al. |
| 2014/0122966 A1 | 5/2014 | Berke et al. |
| 2014/0189197 A1 | 7/2014 | Krithivas et al. |
| 2014/0317337 A1 | 10/2014 | Puthiyedath et al. |
| 2015/0154124 A1 | 6/2015 | Datta et al. |
| 2015/0161037 A1 | 6/2015 | Jayakumar et al. |

FOREIGN PATENT DOCUMENTS

| | | |
|---|---|---|
| CN | 103999057 A | 8/2014 |
| TW | 201342378 A | 10/2013 |
| WO | 2013/101158 A1 | 7/2013 |

OTHER PUBLICATIONS

PCT Application No. PCT/US15/62284; Filing date Nov. 24, 2015; Intel Corporation; International Search Report mailed Nov. 24, 2015.

*Primary Examiner* — Kevin Verbrugge
(74) *Attorney, Agent, or Firm* — Thorpe North & Western, LLP

(57) ABSTRACT

Apparatus, systems, and methods to implement a virtual serial presence detect operation for pooled memory are described. In one embodiment, a controller comprises logic to receive a request to establish a composed computing device, define a plurality of virtual memory devices to be associated with a composed computing device, allocate memory from a shared pool of physical memory to the plurality of virtual memory devices, create a plurality of virtual serial detects (vSPDs) for the plurality of virtual memory devices, and store the plurality of vSPDs in a linked list in an operational memory device. Other embodiments are also disclosed and claimed.

16 Claims, 7 Drawing Sheets

VIRTUAL SERIAL PRESENCE DETECT FOR POOLED MEMORY

TECHNICAL FIELD

The present disclosure generally relates to the field of electronics. More particularly, some embodiments of the invention generally relate to techniques to implement a virtual serial presence detect operation for pooled memory for composed computing devices.

BACKGROUND

Some high performance computing architectures are adopting a model of physical disaggregation of computing resources. Disaggregated resources may then be combined logically, e.g., by control plane software, to define virtual compute resources, sometimes referred to as composed servers, or more broadly as composed computing devices. Such a model enables computing resources to be assigned dynamically to computing tasks in accordance with resource requirement of the computing tasks.

Computing systems which implement a disaggregation model may implement a pooled memory model in which physical memory is disaggregated into a shared memory pool. The shared memory pool may be managed by a shared memory controller, which assigns memory from the pool of memory to composed servers. Accordingly, techniques to manage pooled memory resources may find utility, e.g., in memory systems for composed computing devices.

BRIEF DESCRIPTION OF THE DRAWINGS

The detailed description is provided with reference to the accompanying figures. The use of the same reference numbers in different figures indicates similar or identical items.

DESCRIPTION OF EMBODIMENTS

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof.

As described above, disaggregated computing models may implement a pooled memory model in which physical memory is disaggregated into a shared memory pool. Virtual memory devices may be formed from the pooled memory and allocated to composed computing devices which may be instantiated to perform one or more specific computing tasks. Following completion of the computing task assigned to a virtual machine, the virtual machine may be decomposed and the compute resources for the machine may be made available for other virtual machines. Thus, a disaggregated computing environment may be inherently dynamic in the sense that compute resources are constantly being allocated to virtual machines as they are composed, and recovered from virtual machines as they are decomposed.

Allocating virtual memory from a shared memory pool generates a number of issues. A first issue is that the serial presence detect (SPD) of a physical memory device from which the memory is allocated to a virtual memory device is not available to the basic input/output system (BIOS) of a composed computing device. A second issue is that the dynamic nature of the computing environment creates issues for scaling and reprovisioning resources, including memory.

To address these and other issues, described herein are architectures and methods to manage pooled memory resources in a disaggregated computing environment. More particularly, the architectures and methods described herein provide a virtual serial presence detect (vSPD) mechanism to be implemented which enables a basic input/output system (BIOS) of a composed computing device to discover the pooled memory assigned to it. Further, memory resources may be reprovisioned dynamically to support changes in the computing environment.

Figure 1:
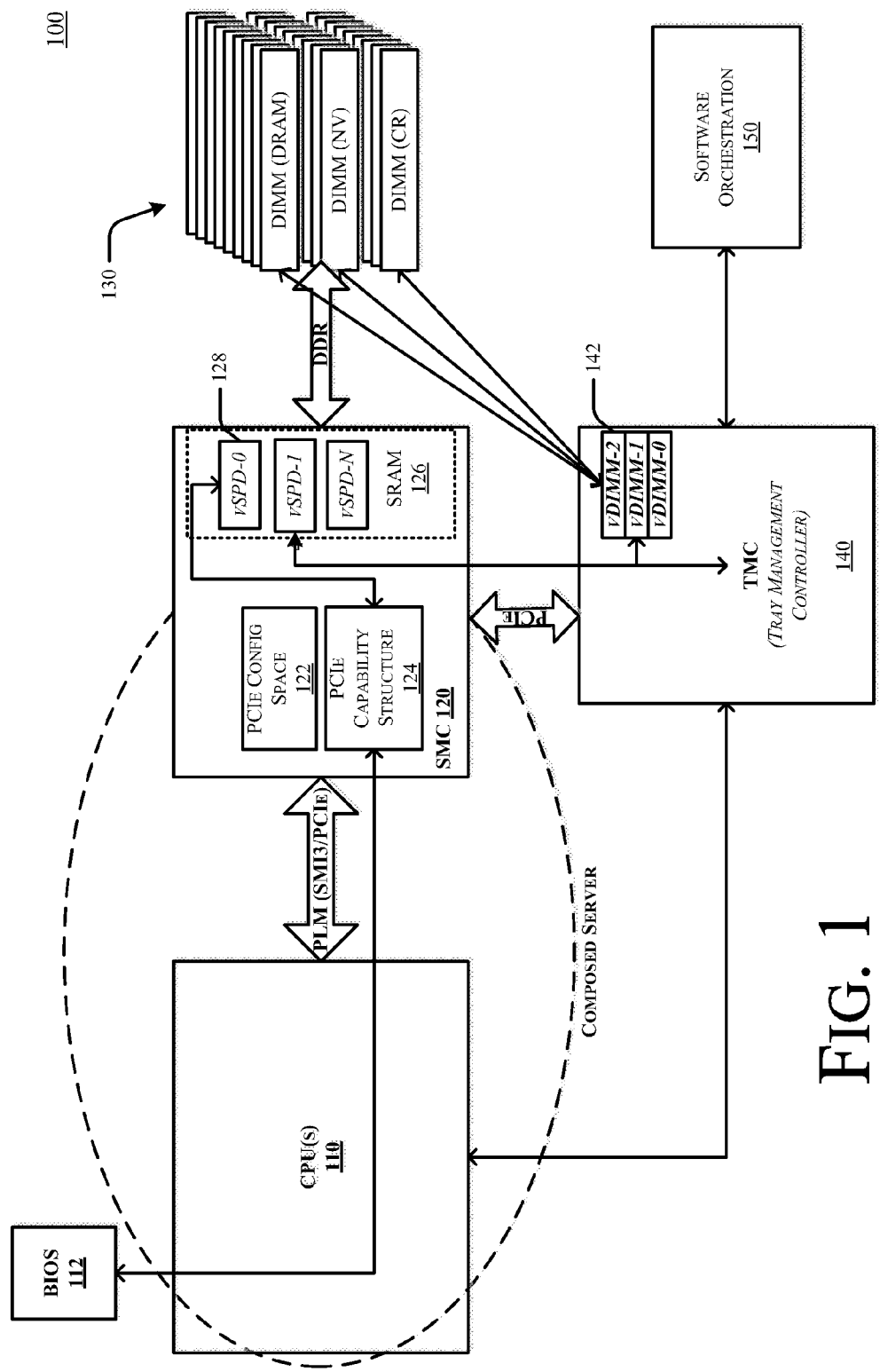
FIG. 1 is a schematic, block diagram illustration of components of a computing environment to implement a virtual serial presence detect operation for pooled memory for composed computing devices in accordance with various examples discussed herein.

FIG. 1 is a schematic, block diagram illustration of components of a computing environment 100 to implement a virtual serial presence detect operation for pooled memory for electronic devices in accordance with various examples discussed herein. In some examples the computing environment may be implemented as a rack scale architecture suitable for use in a cloud-based computing environment.

Referring to FIG. 1, in some examples a computing environment 100 comprises a number of processors (CPUs) 110 communicatively coupled to a shared memory controller (SMC) 120 via a suitable communication interface, e.g., a Storage Management Interface (SMI) or a Peripheral Component Interconnect Express (PCIe) interface. SMC 120 may be communicatively coupled to a pooled memory resource 130 via a suitable communication interface, e.g., a double data rate (DDR) interface. Examples of such standards include, but are not limited to, the DDR3 Synchronous Dynamic Random-Access Memory (SDRAM) standard JESD79-3, published June 2007 by the JEDEC Solid State Technology Association, the DDR3L SDRAM standard JESD79-3-1, published Jul. 26, 2010 by the JEDEC Solid State Technology Association and the DDR4 SDRAM standard JESD79-4, published Sep. 25, 2012 by the JEDEC Solid State Technology Association. Other examples include the LPDDR3 JESD209-3 LPDDR3 Low Power Memory Device Standard, published May 17, 2012 by the JEDEC Solid State Technology Association, the LPDDR4 Low Power Memory Device Standard JESD209-4, published August 2014 by the JEDEC Solid State Technology Association and the Graphics Double Data Rate (GDDR5) Synchronous Graphics Random-Access Memory (SGRAM)

Standard JESD212B.01, published December 2013 by the JEDEC Solid State Technology Association. However, such discussion may be extended to additionally or alternatively apply to any of a variety of DDR and/or other memory standards. A tray management controller (TMC) 140 is communicatively coupled to the SMC 120 via a suitable communication interface, e.g., a PCIe interface and to the CPU(s) 110 and a software orchestration module 150 via a communication interface.

In some examples, CPU(s) 100 may be embodied as an Intel® Atom™ processors, Intel® Atom™ based System-on-a-Chip (SOC) or Intel® Core2 Duo® or i3/i5/i7 series processor available from Intel Corporation, Santa Clara, Calif., USA. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit.

In some examples, shared memory controller (SMC) 120 may be implemented as a logical device which executes on one or more general purpose processors such as CPU(s) 110. In other examples SMC 120 may be implemented on a dedicated controller such as a field gate programmable array (FPGA) or may be reduced to hardwired circuitry. In the example depicted in FIG. 1, SMC 120 comprises a PCIe configuration space 122, a PCIe capability structure 124, and static random access memory (SRAM) 126.

Memory 130 may be implemented as a solid state drive (SSD), a nonvolatile direct in-line memory module (NV-DIMM) or the like. In various examples, at least some of the memory 130 may comprise nonvolatile memory, e.g., phase change memory, NAND (flash) memory, ferroelectric random-access memory (FeTRAM), nanowire-based non-volatile memory, memory that incorporates memristor technology, a static random access memory (SRAM), three dimensional (3D) cross point memory such as phase change memory (PCM), spin-transfer torque memory (STT-RAM) or NAND memory. The specific configuration of the memory 130 is not critical.

Tray management controller 140 may be implemented as a logical device which executes on one or more general purpose processors such as CPU(s) 110. In other examples SMC 120 may be implemented on a dedicated controller such as a field gate programmable array (FPGA) or may be reduced to hardwired circuitry. Software orchestration module 150 may be implemented as logic instructions which execute on a processing device, i.e., software.

As described above, in some examples logic, e.g., in the tray management controller 140, alone or in combination with logic in shared memory controller (SMC) 120 implement a virtual serial presence detect operation for pooled memory for electronic devices. Techniques to implement a virtual serial presence detect operation will be explained with reference to FIGS. 2-5.

Figure 2:
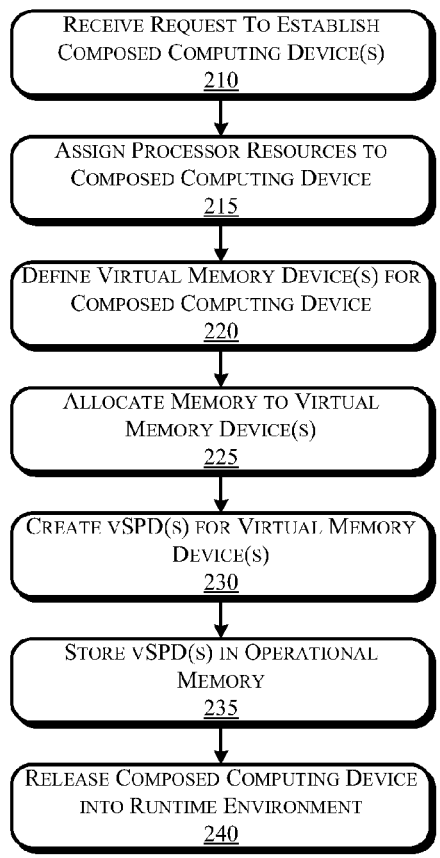
FIGS. 2-5 flowcharts illustrating operations in methods to implement a virtual serial presence detect operation for pooled memory for composed computing devices in accordance with various embodiments discussed herein.

Referring to FIG. 2, at operation 210 the tray management controller 140 receives a request to establish one or more composed computing devices. In some examples the request may originate from the software orchestration module 150. At operation 215 processor resources are assigned to the composed computing device(s) which are the subject of the request issued in operation 210. In some examples at least a portion of a CPU 110 may be allocated to the composed computing device(s) which are the subject of the request issued in operation 210. Similarly, at operation 220 one or more virtual memory devices are assigned to the composed computing device(s) which are the subject of the request issued in operation 210.

At operation 225 control plane software on TMC 140 allocates memory from the shared memory pool 130 to the composed computing device(s) which are the subject of the request issued in operation 210. The amount of memory allocated may be fixed or may depend upon configuration parameters provided by the software orchestration module. In some examples each composed computing device may be assigned a number of volatile, persistent, messaging, and shared memory regions in memory pool 130, which may be characterized as virtual DIMMs, or vDIMMs 142 in tray management controller 140.

At operation 230 control plane software on TMC 150 creates a virtual serial presence detect (vSPD) for each of the virtual memory devices created in operation 225, and at operation 235 the vSPDs created at operation 230 are stored in operational memory, e.g., SRAM 126, of the shared memory controller 120. In some examples the vSPDs are stored in SRAM 126 as a linked list in the SRAM 126 and assigns the vSPD to the PCIe capability structure 124 in SMC 120.

At operation 240 control plane software on TMC 140 releases the composed computing device(s) into a runtime environment. For example, control plane software on TMC 140 may release composed computing devices that have a vSPD allocated in SRAM 126 from a reset state, such that the BIOS 112 of the composed computing device to enumerate shared memory through its PCIe capability structure 124. Once released into a runtime environment the composed computing device(s) may be assigned computing tasks. Further, vSPDs can be deleted after the BIOS 112 on a composed computing device enumerates pooled memory allocated to the composed computing device, thereby freeing up vSPD space in the SRAM 126 on SMC 120 to be reused for other composed servers.

As described above, resources available in a runtime environment may change as composed computing devices are instantiated and decomposed, or as memory resources available change. In some examples the a composed computing device is operational. In some examples memory resources assigned to a composed computing device may be reconfigured to accommodate changes in the runtime environment.

Figure 3:
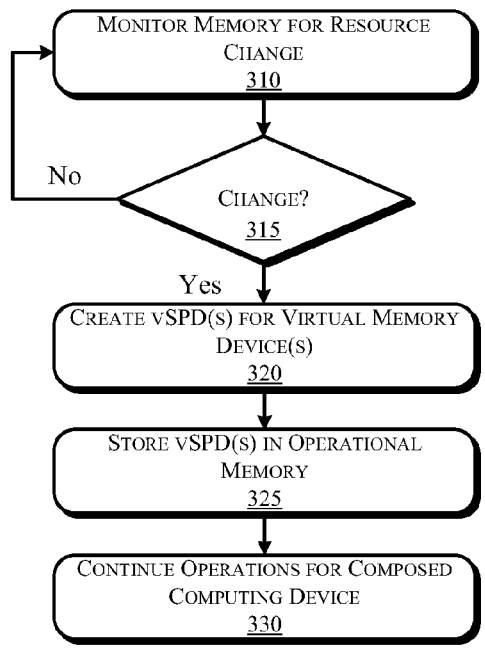

Referring to FIG. 3, at operation 310 the control plane software on TMC 140 monitors memory 130 for changes in memory resources available. For example, memory resources available in memory 130 may change when the software orchestrator 150 reprovisions the amount of pooled memory in memory 130 allocated to a composed computing device. If, at operation 315, there is no change in memory resources then control passes back to operation 310 and the control plane software on TMC 140 continues to monitor memory 130.

By contrast, if at operation 315 memory resources available in memory 130 have changed then control passes to operation 320 and control plane software on TMC 140 creates a virtual serial presence detect (vSPD) for each of the virtual memory devices created in operation 225, and at operation 325 the vSPDs created at operation 230 are stored in operational memory, e.g., SRAM 126, of the shared memory controller 120. In some examples the vSPDs are stored in SRAM 126 as a linked list in the SRAM 126 and assigns the vSPD to the PCIe capability structure 124 in SMC 120. At operation 330 operations may be continued on the composed computing device(s).

Figure 4:
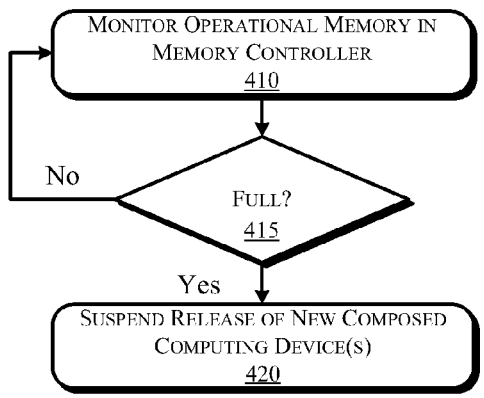

In some examples the control plane software on TMC 140 is configured to control the number of composed computing devices that are released into the runtime environment in order to manage consumption of the SRAM 126 on memory controller 120. Referring to FIG. 4, at operation 410 the control plane software on TMC 140 monitors the operational memory (i.e., SRAM 126) in the memory controller. If, at operation 415, the memory is not full then control passes back to operation 410 and the control plane software on TMC 140 continues to monitor SRAM 126.

By contrast, if at operation 415 the SRAM 126 is at full capacity then control passes to operation 420 and control plane software on TMC 150 suspends releases of composed computing device(s) into the runtime environment.

Figure 5:
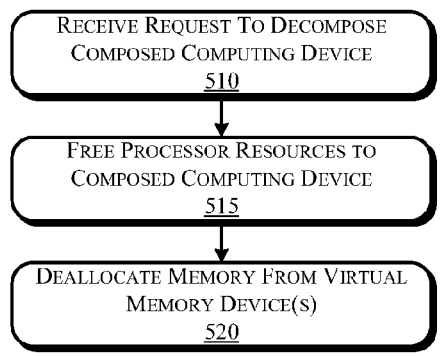

FIG. 5 depicts operations in a method to decompose a composed computing device. Referring to FIG. 5, at operation 510 a request to decompose a composed computing device is received. For example, the request may originate with the software orchestration module 150. At operation 515 the control plane software on TMC 150 frees processor resources allocated to the composed computing device that is the subject of the request received in operation 510. At operation 520 the control plane software on TMC 140 deallocates memory from the vDIMMs 142 allocated to the computing device that is the subject of the request received in operation 510.

Figure 6:
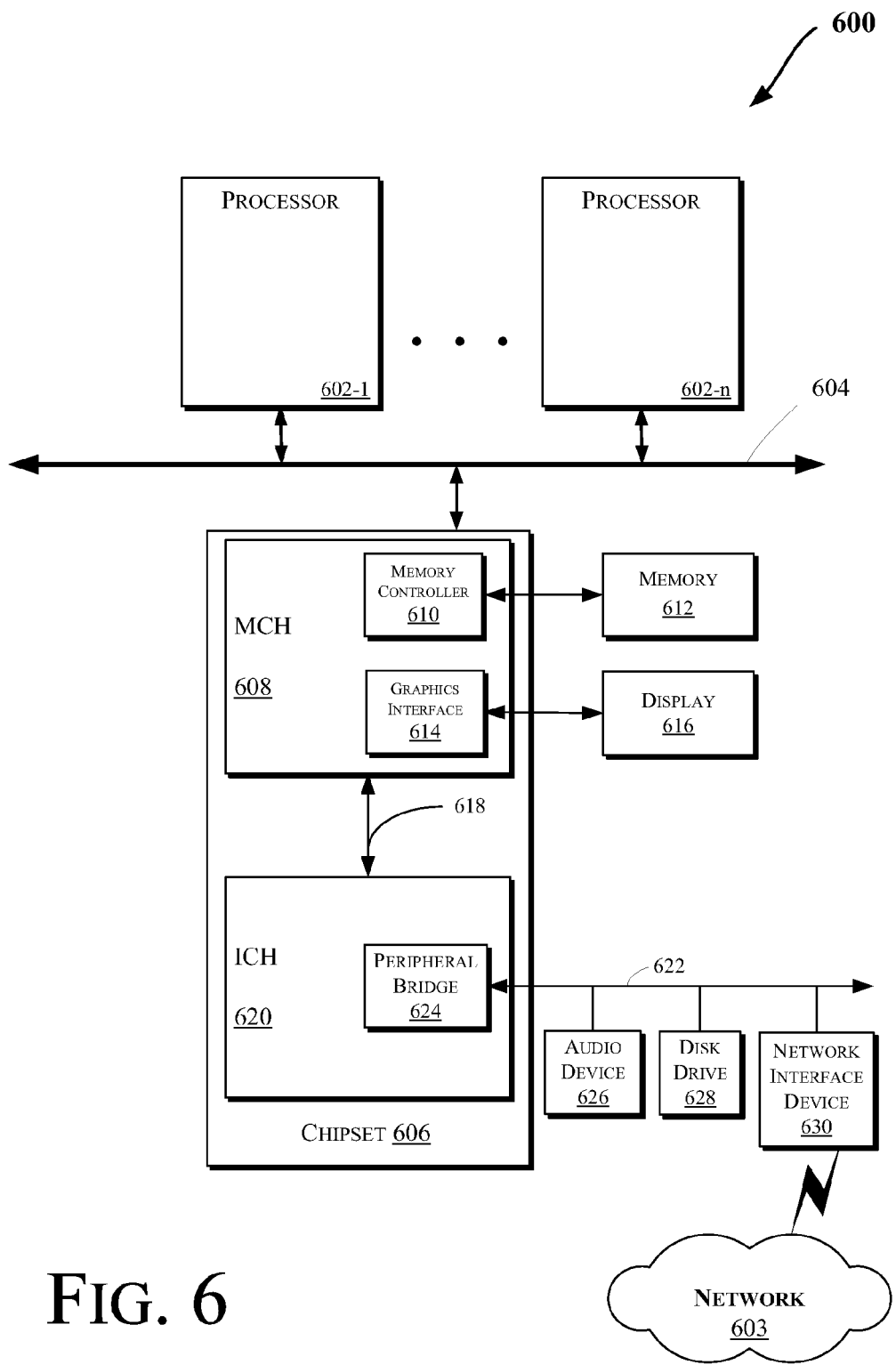
FIGS. 6-10 are schematic, block diagram illustrations of electronic devices which may be adapted to implement a virtual serial presence detect operation for pooled memory for composed computing devices in accordance with various embodiments discussed herein.

As described above, in some embodiments the electronic device may be embodied as a computer system. FIG. 6 illustrates a block diagram of a computing system 600 in accordance with an embodiment of the invention. The computing system 600 may include one or more central processing unit(s) (CPUs) 602 or processors that communicate via an interconnection network (or bus) 604. The processors 602 may include a general purpose processor, a network processor (that processes data communicated over a computer network 603), or other types of a processor (including a reduced instruction set computer (RISC) processor or a complex instruction set computer (CISC)). Moreover, the processors 602 may have a single or multiple core design. The processors 602 with a multiple core design may integrate different types of processor cores on the same integrated circuit (IC) die. Also, the processors 602 with a multiple core design may be implemented as symmetrical or asymmetrical multiprocessors. In an embodiment, one or more of the processors 602 may be the same or similar to the processors 102 of FIG. 1. For example, one or more of the processors 602 may include the control unit 120 discussed with reference to FIGS. 1-3. Also, the operations discussed with reference to FIGS. 3-5 may be performed by one or more components of the system 600.

A chipset 606 may also communicate with the interconnection network 604. The chipset 606 may include a memory control hub (MCH) 608. The MCH 608 may include a memory controller 610 that communicates with a memory 612 (which may be the same or similar to the memory 130 of FIG. 1). The memory 412 may store data, including sequences of instructions, that may be executed by the CPU 602, or any other device included in the computing system 600. In one embodiment of the invention, the memory 612 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk or a solid state drive (SSD). Additional devices may communicate via the interconnection network 604, such as multiple CPUs and/or multiple system memories.

The MCH 608 may also include a graphics interface 614 that communicates with a display device 616. In one embodiment of the invention, the graphics interface 614 may communicate with the display device 616 via an accelerated graphics port (AGP). In an embodiment of the invention, the display 616 (such as a flat panel display) may communicate with the graphics interface 614 through, for example, a signal converter that translates a digital representation of an image stored in a storage device such as video memory or system memory into display signals that are interpreted and displayed by the display 616. The display signals produced by the display device may pass through various control devices before being interpreted by and subsequently displayed on the display 616.

A hub interface 618 may allow the MCH 608 and an input/output control hub (ICH) 620 to communicate. The ICH 620 may provide an interface to I/O device(s) that communicate with the computing system 600. The ICH 620 may communicate with a bus 622 through a peripheral bridge (or controller) 624, such as a peripheral component interconnect (PCI) bridge, a universal serial bus (USB) controller, or other types of peripheral bridges or controllers. The bridge 624 may provide a data path between the CPU 602 and peripheral devices. Other types of topologies may be utilized. Also, multiple buses may communicate with the ICH 620, e.g., through multiple bridges or controllers. Moreover, other peripherals in communication with the ICH 620 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 622 may communicate with an audio device 626, one or more disk drive(s) 628, and a network interface device 630 (which is in communication with the computer network 603). Other devices may communicate via the bus 622. Also, various components (such as the network interface device 630) may communicate with the MCH 608 in some embodiments of the invention. In addition, the processor 602 and one or more other components discussed herein may be combined to form a single chip (e.g., to provide a System on Chip (SOC)). Furthermore, the graphics accelerator 616 may be included within the MCH 608 in other embodiments of the invention.

Furthermore, the computing system 600 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 628), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 7:
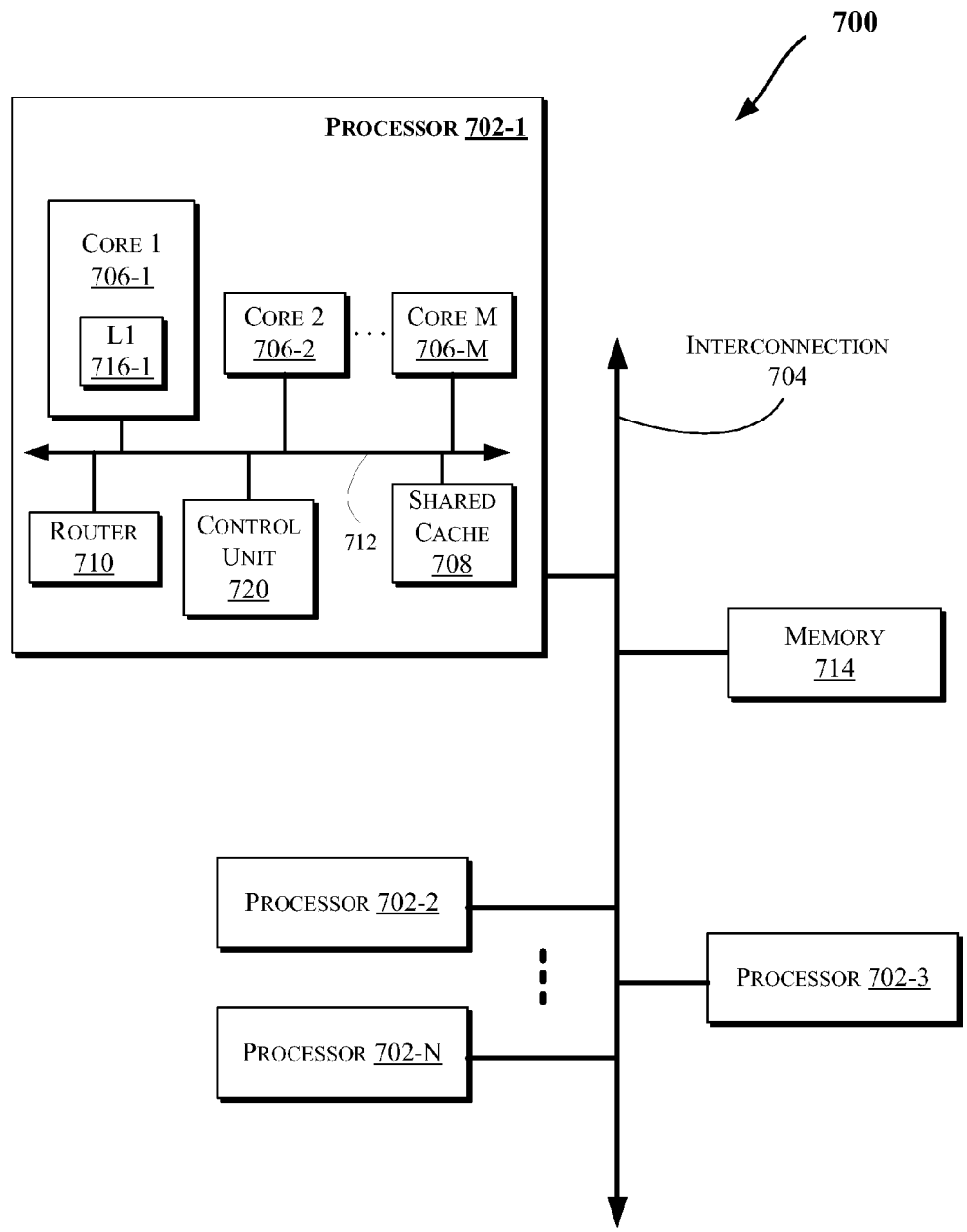

FIG. 7 illustrates a block diagram of a computing system 700, according to an embodiment of the invention. The system 700 may include one or more processors 702-1 through 702-N (generally referred to herein as "processors 702" or "processor 702"). The processors 702 may communicate via an interconnection network or bus 704. Each processor may include various components some of which are only discussed with reference to processor 702-1 for clarity. Accordingly, each of the remaining processors 702-2 through 702-N may include the same or similar components discussed with reference to the processor 702-1.

In an embodiment, the processor 702-1 may include one or more processor cores 706-1 through 706-M (referred to herein as "cores 706" or more generally as "core 706"), a shared cache 708, a router 710, and/or a processor control logic or unit 720. The processor cores 706 may be implemented on a single integrated circuit (IC) chip. Moreover, the chip may include one or more shared and/or private caches (such as cache 708), buses or interconnections (such as a bus or interconnection network 712), memory controllers, or other components.

In one embodiment, the router 710 may be used to communicate between various components of the processor 702-1 and/or system 700. Moreover, the processor 702-1 may include more than one router 710. Furthermore, the multitude of routers 710 may be in communication to enable data routing between various components inside or outside of the processor 702-1.

The shared cache 708 may store data (e.g., including instructions) that are utilized by one or more components of the processor 702-1, such as the cores 706. For example, the shared cache 708 may locally cache data stored in a memory 714 for faster access by components of the processor 702. In an embodiment, the cache 708 may include a mid-level cache (such as a level 2 (L2), a level 3 (L3), a level 4 (L4), or other levels of cache), a last level cache (LLC), and/or combinations thereof. Moreover, various components of the processor 702-1 may communicate with the shared cache 708 directly, through a bus (e.g., the bus 712), and/or a memory controller or hub. As shown in FIG. 7, in some embodiments, one or more of the cores 706 may include a level 1 (L1) cache 716-1 (generally referred to herein as "L1 cache 716"). In one embodiment, the control unit 720 may include logic to implement the operations described above with reference to the memory controller 122 in FIG. 2.

Figure 8:
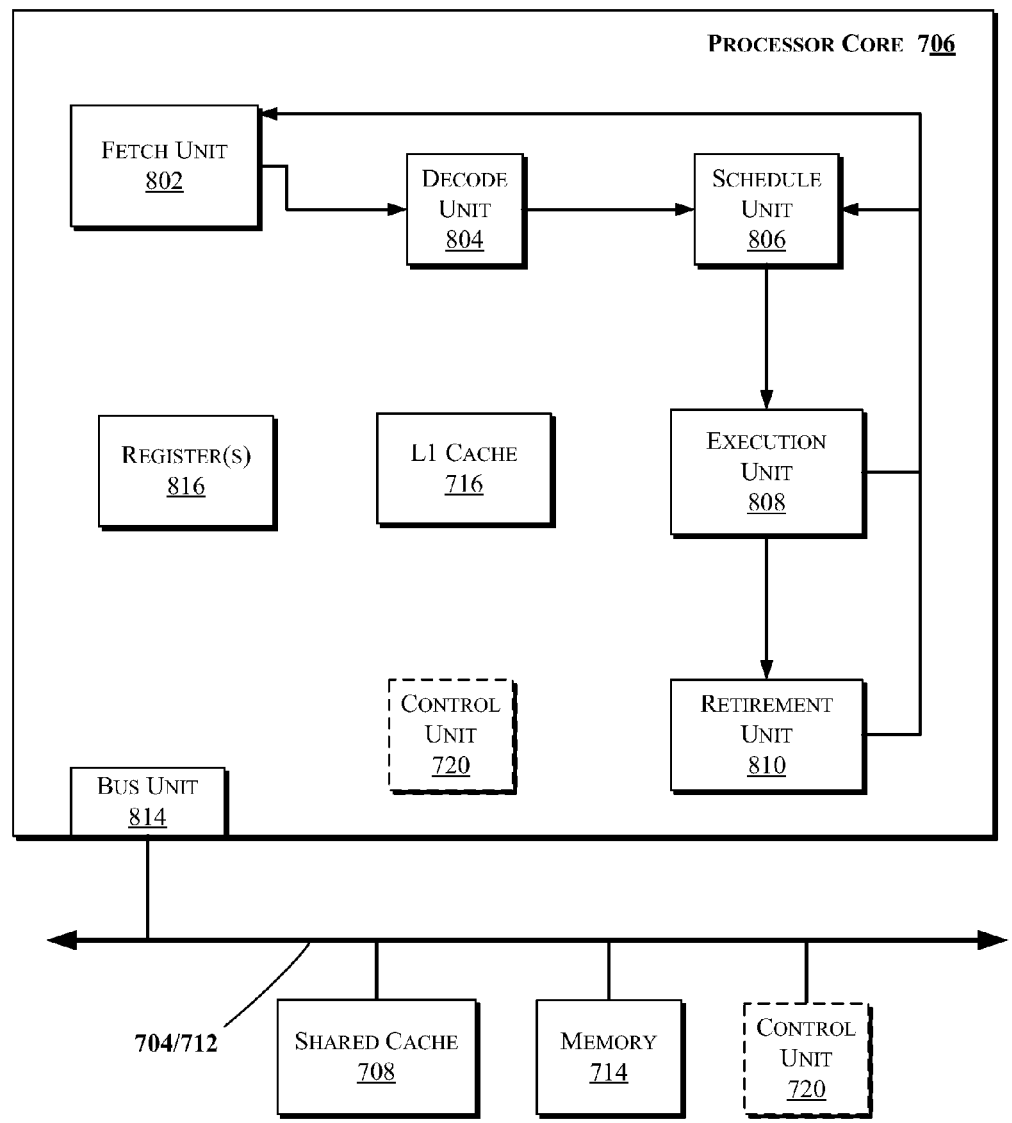

FIG. 8 illustrates a block diagram of portions of a processor core 706 and other components of a computing system, according to an embodiment of the invention. In one embodiment, the arrows shown in FIG. 8 illustrate the flow direction of instructions through the core 706. One or more processor cores (such as the processor core 706) may be implemented on a single integrated circuit chip (or die) such as discussed with reference to FIG. 7. Moreover, the chip may include one or more shared and/or private caches (e.g., cache 708 of FIG. 7), interconnections (e.g., interconnections 704 and/or 112 of FIG. 7), control units, memory controllers, or other components.

As illustrated in FIG. 8, the processor core 706 may include a fetch unit 802 to fetch instructions (including instructions with conditional branches) for execution by the core 706. The instructions may be fetched from any storage devices such as the memory 714. The core 706 may also include a decode unit 804 to decode the fetched instruction. For instance, the decode unit 804 may decode the fetched instruction into a plurality of uops (micro-operations).

Additionally, the core 706 may include a schedule unit 806. The schedule unit 806 may perform various operations associated with storing decoded instructions (e.g., received from the decode unit 804) until the instructions are ready for dispatch, e.g., until all source values of a decoded instruction become available. In one embodiment, the schedule unit 806 may schedule and/or issue (or dispatch) decoded instructions to an execution unit 808 for execution. The execution unit 808 may execute the dispatched instructions after they are decoded (e.g., by the decode unit 804) and dispatched (e.g., by the schedule unit 806). In an embodiment, the execution unit 808 may include more than one execution unit. The execution unit 808 may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit 808.

Further, the execution unit 808 may execute instructions out-of-order. Hence, the processor core 706 may be an out-of-order processor core in one embodiment. The core 706 may also include a retirement unit 810. The retirement unit 810 may retire executed instructions after they are committed. In an embodiment, retirement of the executed instructions may result in processor state being committed from the execution of the instructions, physical registers used by the instructions being de-allocated, etc.

The core 706 may also include a bus unit 714 to enable communication between components of the processor core 706 and other components (such as the components discussed with reference to FIG. 8) via one or more buses (e.g., buses 804 and/or 812). The core 706 may also include one or more registers 816 to store data accessed by various components of the core 706 (such as values related to power consumption state settings).

Furthermore, even though FIG. 7 illustrates the control unit 720 to be coupled to the core 706 via interconnect 812, in various embodiments the control unit 720 may be located elsewhere such as inside the core 706, coupled to the core via bus 704, etc.

Figure 9:
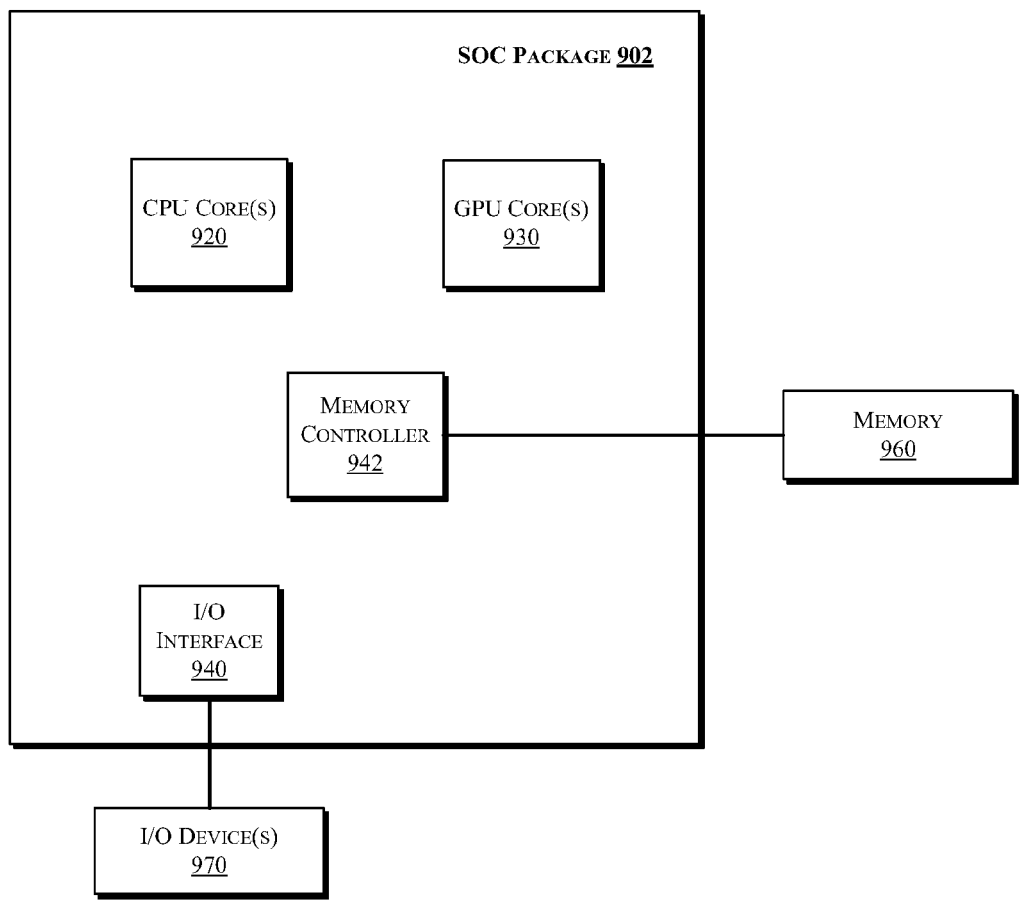

In some embodiments, one or more of the components discussed herein can be embodied as a System On Chip (SOC) device. FIG. 9 illustrates a block diagram of an SOC package in accordance with an embodiment. As illustrated in FIG. 9, SOC 902 includes one or more Central Processing Unit (CPU) cores 920, one or more Graphics Processor Unit (GPU) cores 930, an Input/Output (I/O) interface 940, and a memory controller 942. Various components of the SOC package 902 may be coupled to an interconnect or bus such as discussed herein with reference to the other figures. Also, the SOC package 902 may include more or less components, such as those discussed herein with reference to the other figures. Further, each component of the SOC package 902 may include one or more other components, e.g., as discussed with reference to the other figures herein. In one embodiment, SOC package 902 (and its components) is provided on one or more Integrated Circuit (IC) die, e.g., which are packaged into a single semiconductor device.

As illustrated in FIG. 9, SOC package 902 is coupled to a memory 960 (which may be similar to or the same as memory discussed herein with reference to the other figures) via the memory controller 942. In an embodiment, the memory 960 (or a portion of it) can be integrated on the SOC package 902.

The I/O interface 940 may be coupled to one or more I/O devices 970, e.g., via an interconnect and/or bus such as discussed herein with reference to other figures. I/O device(s) 970 may include one or more of a keyboard, a mouse, a touchpad, a display, an image/video capture device (such as a camera or camcorder/video recorder), a touch screen, a speaker, or the like.

Figure 10:
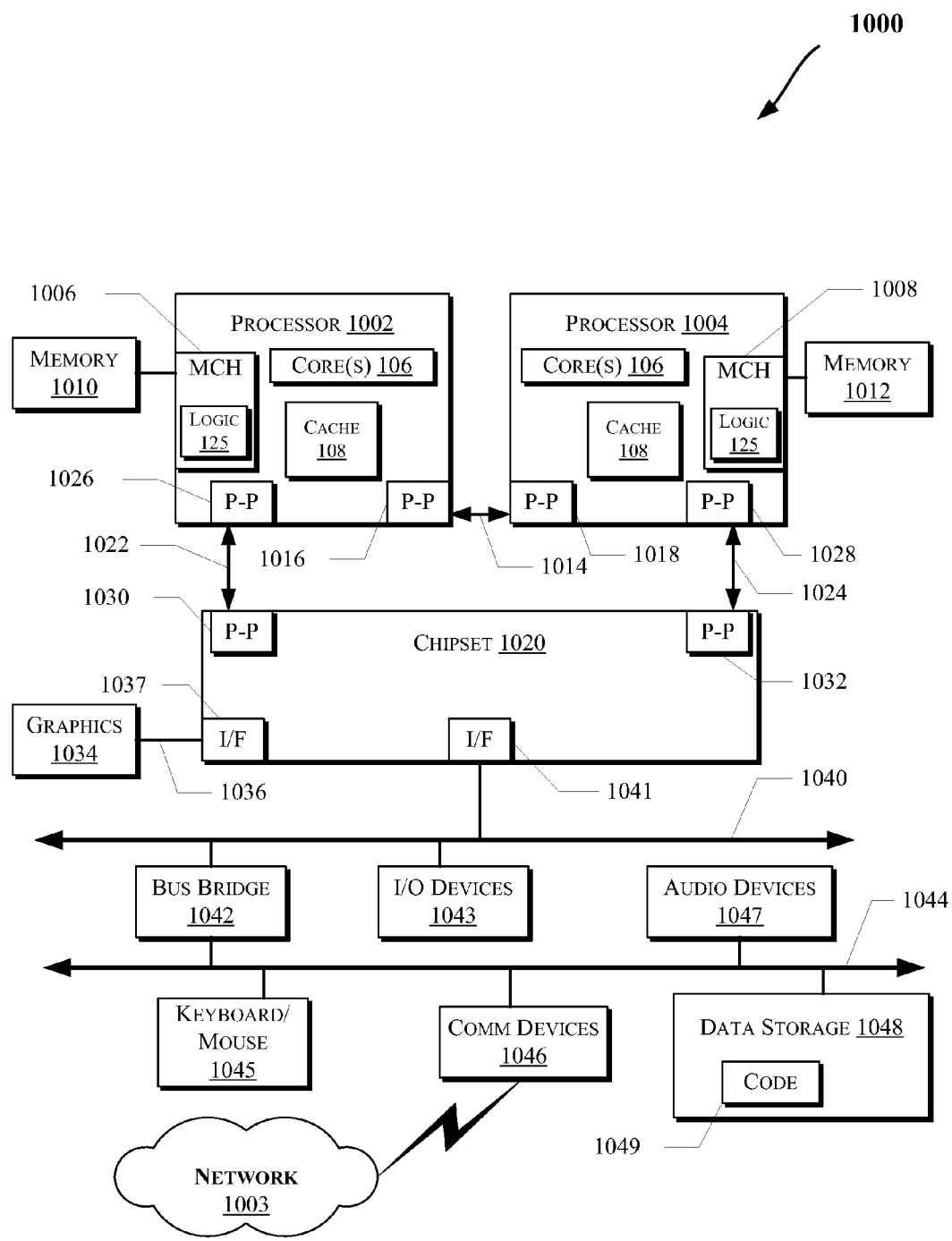

FIG. 10 illustrates a computing system 1000 that is arranged in a point-to-point (PtP) configuration, according to an embodiment of the invention. In particular, FIG. 10 shows a system where processors, memory, and input/output devices are interconnected by a number of point-to-point interfaces. The operations discussed with reference to FIG. 2 may be performed by one or more components of the system 1000.

As illustrated in FIG. 10, the system 1000 may include several processors, of which only two, processors 1002 and 1004 are shown for clarity. The processors 1002 and 1004 may each include a local memory controller hub (MCH) 1006 and 1008 to enable communication with memories 1010 and 1012. MCH 1006 and 1008 may include the memory controller 120 and/or logic 125 of FIG. 1 in some embodiments.

In an embodiment, the processors 1002 and 1004 may be one of the processors 702 discussed with reference to FIG. 7. The processors 1002 and 1004 may exchange data via a point-to-point (PtP) interface 1014 using PtP interface circuits 1016 and 1018, respectively. Also, the processors 1002 and 1004 may each exchange data with a chipset 1020 via individual PtP interfaces 1022 and 1024 using point-to-point interface circuits 1026, 1028, 1030, and 1032. The chipset 1020 may further exchange data with a high-performance graphics circuit 1034 via a high-performance graphics interface 1036, e.g., using a PtP interface circuit 1037.

As shown in FIG. 10, one or more of the cores 106 and/or cache 108 of FIG. 1 may be located within the processors 902 and 904. Other embodiments of the invention, however, may exist in other circuits, logic units, or devices within the system 900 of FIG. 9. Furthermore, other embodiments of the invention may be distributed throughout several circuits, logic units, or devices illustrated in FIG. 9.

The chipset 920 may communicate with a bus 940 using a PtP interface circuit 941. The bus 940 may have one or more devices that communicate with it, such as a bus bridge 942 and I/O devices 943. Via a bus 944, the bus bridge 943 may communicate with other devices such as a keyboard/mouse 945, communication devices 946 (such as modems, network interface devices, or other communication devices that may communicate with the computer network 803), audio I/O device, and/or a data storage device 948. The data storage device 948 (which may be a hard disk drive or a NAND flash based solid state drive) may store code 949 that may be executed by the processors 902 and/or 904.

The following pertains to further examples.

Example 1 is a controller comprising logic, at least partially including hardware logic, to receive a request to establish a composed computing device, define a plurality of virtual memory devices to be associated with a composed computing device, allocate memory from a shared pool of physical memory to the plurality of virtual memory devices, create a plurality of virtual serial detects (vSPDs) for the plurality of virtual memory devices and store the plurality of vSPDs in a linked list in an operational memory device.

In Example 2, the subject matter of Example 1 can optionally include logic, at least partially including hardware logic, to assign the plurality of vSPDs to a Peripheral Component Interconnect Express (PCIe) capability structure for the composed computing device In Example 3, the subject matter of any one of Examples 1-2 can optionally include logic, at least partially including hardware logic, to release a composed computing device into a runtime environment.

In Example 4, the subject matter of any one of Examples 1-3 can optionally include logic to logic, at least partially including hardware logic, to detect a change in a memory region allocated to the plurality of virtual memory devices, and in response to the change, to create a plurality of virtual serial detects (vSPDs) for the plurality of virtual memory devices and store the plurality of vSPDs in a linked list in a volatile memory device.

In Example 5, the subject matter of any one of Examples 1-4 can optionally include logic, at least partially including hardware logic, to assign the plurality of vSPDs to a Peripheral Component Interconnect Express (PCIe) capability structure for the composed computing device.

In Example 6, the subject matter of any one of Examples 1-5 can optionally include an arrangement in which the memory device is coupled to a shared memory controller.

In Example 7, the subject matter of any one of Examples 1-6 can optionally include an arrangement in which the shared memory controller comprises an operational memory, and wherein the linked list comprising the plurality of vSPDs is stored in the operational memory.

In Example 8, the subject matter of any one of Examples 1-7 can optionally include logic, at least partially including hardware logic, to reuse at least a portion of the memory in the operational memory of the memory controller.

In Example 9, the subject matter of any one of Examples 1-8 can optionally include logic, at least partially including hardware logic, to monitor operational memory in the shared memory controller and suspend a release of a new composed computing device when the operational memory is at full capacity.

In Example 10, the subject matter of any one of Examples 1-9 can optionally include an arrangement in which the shared pool of physical memory comprises a plurality of dual in-line memory modules (DIMMs).

Example 11 is a computer-based method to allocate resources in a virtual computing environment, comprising receiving, in a controller, a request to establish a composed computing device, defining, in the controller, a plurality of virtual memory devices to be associated with a composed computing device, allocating, in the controller, memory from a shared pool of physical memory to the plurality of virtual memory devices, creating, in the controller, a plurality of virtual serial detects (vSPDs) for the plurality of virtual memory devices and storing the plurality of vSPDs in a linked list in an operational memory device communicatively coupled to the controller.

In Example 12, the subject matter of Example 11 can optionally include assigning the plurality of vSPDs to a Peripheral Component Interconnect Express (PCIe) capability structure for the composed computing device In Example 13, the subject matter of any one of Examples 11-12 can releasing a composed computing device into a runtime environment.

In Example 14, the subject matter of any one of Examples 11-13 can optionally include detecting a change in a memory region allocated to the plurality of virtual memory devices, and in response to the change, creating a plurality of virtual serial detects (vSPDs) for the plurality of virtual memory devices and store the plurality of vSPDs in a linked list in a volatile memory device.

In Example 15, the subject matter of any one of Examples 11-14 can optionally include assigning the plurality of vSPDs to a Peripheral Component Interconnect Express (PCIe) capability structure for the composed computing device.

In Example 16, the subject matter of any one of Examples 11-15 can optionally include an arrangement in which the memory device is coupled to a shared memory controller.

In Example 17, the subject matter of any one of Examples 11-16 can optionally include an arrangement in which the shared memory controller comprises an operational memory, and wherein the linked list comprising the plurality of vSPDs is stored in the operational memory.

In Example 18, the subject matter of any one of Examples 11-17 can optionally include reusing at least a portion of the memory in the operational memory of the memory controller.

In Example 19, the subject matter of any one of Examples 11-18 can optionally include monitoring operational memory in the shared memory controller and suspending a release of a new composed computing device when the operational memory is at full capacity.

In Example 20, the subject matter of any one of Examples 11-19 can optionally include an arrangement in which the shared pool of physical memory comprises a plurality of dual in-line memory modules (DIMMs).

In various embodiments of the invention, the operations discussed herein, e.g., with reference to FIGS. 1-10, may be implemented as hardware (e.g., circuitry), software, firmware, microcode, or combinations thereof, which may be provided as a computer program product, e.g., including a tangible (e.g., non-transitory) machine-readable or computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed herein.

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. A controller comprising logic, at least partially including hardware logic, to:
receive a request to establish a composed computing device;
define a plurality of virtual memory devices to be associated with the composed computing device;
allocate memory from a shared pool of physical memory to the plurality of virtual memory devices;
create a plurality of virtual serial detects (vSPDs) for the plurality of virtual memory devices; and
store the plurality of vSPDs in a linked list in an operational memory device.

2. The controller of claim 1, further comprising logic, at least partially including hardware logic, to:
assign the plurality of vSPDs to a Peripheral Component Interconnect Express (PCIe) capability structure for the composed computing device.

3. The controller of claim 1, further comprising logic, at least partially including hardware logic, to:
release the composed computing device into a runtime environment.

4. The controller of claim 3, further comprising logic, at least partially including hardware logic, to:
detect a change in a memory region of the memory allocated to the plurality of virtual memory devices, and in response to the change, to:
create a second plurality of virtual serial detects (vSPDs) for the plurality of virtual memory devices; and
store the second plurality of vSPDs in the linked list in a volatile memory device.

5. The controller of claim 4, further comprising logic, at least partially including hardware logic, to:
assign the second plurality of vSPDs to a Peripheral Component Interconnect Express (PCIe) capability structure for the composed computing device.

6. The controller of claim 1, wherein the operational memory device is coupled to a shared memory controller.

7. The controller of claim 6, further comprising logic, at least partially including hardware logic, to:
monitor the operational memory device coupled to the shared memory controller; and
suspend a release of a new composed computing device when the operational memory device is at full capacity.

8. The controller of claim 1, wherein the shared pool of physical memory comprises a plurality of dual in-line memory modules (DIMMs).

9. A computer-based method to allocate resources in a virtual computing environment, comprising:
receiving, in a controller, a request to establish a composed computing device;
defining, in the controller, a plurality of virtual memory devices to be associated with the composed computing device;
allocating, in the controller, memory from a shared pool of physical memory to the plurality of virtual memory devices;
creating, in the controller, a plurality of virtual serial detects (vSPDs) for the plurality of virtual memory devices; and
storing the plurality of vSPDs in a linked list in an operational memory device communicatively coupled to the controller.

10. The method of claim 9, further comprising:
assigning, in the controller, the plurality of vSPDs to a Peripheral Component Interconnect Express (PCIe) capability structure for the composed computing device.

11. The method of claim 9, further comprising:
releasing, in the controller, the composed computing device into a runtime environment.

12. The method of claim 11, further comprising:
detecting, in the controller, a change in a memory region of the memory allocated to the plurality of virtual memory devices, and in response to the change, to:
creating, in the controller, a second plurality of virtual serial detects (vSPDs) for the plurality of virtual memory devices; and
storing the second plurality of vSPDs in the linked list in a volatile memory device communicatively coupled to the controller.

13. The method of claim 12, further comprising:
assigning, in the controller, the second plurality of vSPDs to a Peripheral Component Interconnect Express (PCIe) capability structure for the composed computing device.

14. The method of claim 9, wherein the operational memory device is coupled to a shared memory controller.

15. The method of claim 14, further comprising:
monitoring, in the controller, the operational memory device coupled to the shared memory controller; and
suspending, in the controller a release of a new composed computing device when the operational memory device is at full capacity.

16. The method of claim 9, wherein the shared pool of physical memory comprises a plurality of dual in-line memory modules (DIMMs).

* * * * *